United States Patent [19]

Gross et al.

[11] 3,996,407

[45] Dec. 7, 1976

[54] MAGNETIC RECORDING MEDIA

[75] Inventors: Egon Von Gross, Gien, France; Heinz Stritzinger; Job-Werner Hartmann, both of Ludwigshafen, Germany; Manfred Steuerwald, Frankenthal, Germany; Ursula Klein, Mutterstadt, Germany; Dieter Schaefer, Ludwigshafen, Germany

[73] Assignee: BASF Aktiengesellschaft, Ludwigshafen (Rhine), Germany

[22] Filed: Dec. 18, 1974

[21] Appl. No.: 533,973

[30] Foreign Application Priority Data

Dec. 28, 1973 Germany .......................... 2364877

[52] U.S. Cl. ................................ 428/323; 427/128; 427/130; 428/329; 428/447; 428/451; 428/452

[51] Int. Cl.² .................... B32B 5/16; B32B 9/04

[58] Field of Search .......... 117/234, 235, 238, 240; 360/72, 139; 352/236; 260/448.8 R; 427/127, 128, 130; 428/446, 447, 451, 452, 323, 329

[56] References Cited

UNITED STATES PATENTS

| 3,357,855 | 12/1965 | Bisschops et al. | 117/235 X |
|---|---|---|---|
| 3,476,595 | 11/1969 | Nacci | 117/235 |
| 3,490,946 | 1/1970 | Wolff | 117/238 X |
| 3,585,141 | 6/1971 | Ingersoll | 117/235 X |
| 3,625,760 | 12/1971 | Slovinsky | 117/235 |
| 3,728,262 | 4/1973 | Lemmen et al. | 117/235 X |
| 3,778,308 | 12/1973 | Roller et al. | 117/240 X |
| 3,795,539 | 3/1974 | DiMino | 117/235 |
| 3,836,395 | 9/1974 | Roller et al. | 117/235 |
| 3,840,400 | 10/1974 | Yamada et al. | 117/235 |

FOREIGN PATENTS OR APPLICATIONS

| 1,152,695 | 8/1963 | Germany |
| 1,147,518 | 4/1969 | United Kingdom |

*Primary Examiner*—Lorraine T. Kendell
*Attorney, Agent, or Firm*—Johnston, Keil, Thompson & Shurtleff

[57] ABSTRACT

Magnetic recording media comprising a non-magnetizable flexible base and a firmly adhering magnetic coating based on a dispersion, containing a silane, of a magnetic pigment in a polymeric binder, and a process for their manufacture. The silane is an aminoalkylsilane $R_n Si(OR')_{4-n}$, wherein $n$ is 1, 2 or 3, R' is alkyl of 1 to 8 carbon atoms and R is aminoalkyl of the formula with one or more primary and/or secondary amino groups and from 3 to 11 carbon atoms. Magnetic recording media comprising a magnetic coating containing such a silane exhibit better abrasion resistance and better electromagnetic properties than comparable coatings.

8 Claims, No Drawings

MAGNETIC RECORDING MEDIA

The present invention relates to magnetic recording media comprising a non-magnetizable flexible base and a magnetic coating based on a dispersion, containing an aminoalkylsilane, of a finely divided magnetic pigment in a polymeric binder, and to a process for their manufacture.

The manufacture of magnetic recording media by preparing a dispersion of a finely divided magnetic pigment in a polymeric binder in the presence of volatile organic solvents and of a silicon compound and applying a layer of the resulting magnetic dispersion to non-magnetizable flexible base materials, such as plastics films, paper or cardboard, is known. It is also known from British Pat. No. 1,147,518 to add small amounts of a silane of the formula $R_nSiX_{4-n}$, wherein $n$ is 1, 2 or 3, R is a saturated or unsaturated aliphatic or aromatic hydrocarbon radical and X is halogen, hydroxyl, amino or alkoxy, to the magnetic dispersions. However, the addition of these silanes is not entirely satisfactory since they can easily have an adverse effect on the sensitive pulverulent magnetic materials or on the magnetic properties of the coating.

We have found that magnetic coatings which are distinguished in particular by improved electromagnetic properties and good abraresistance can be prepared particularly advantageously from dispersions of finely divided magnetic pigments in polymeric binders to which certain silane compounds have been added.

Accordingly, the present invention relates to a process for the manufacture of magnetic recording media by applying a layer of a dispersion, containing a silane, of a finely divided magnetic magnetic pigment in a solution of a polymeric binder to a non-magnetizable flexible base, orienting the magnetic particles in a magnetic field, drying and optionally subjecting the applied magnetic coating to a surface treatment, wherein the silane is an aminoalkylsilane of the formula $R_nSi(OR')_{4-n}$ in which $n$ is 1, 2 or 3, R' is alkyl of 1 to 8 carbon atoms and R is aminoalkyl with one or more primary and/or secondary amino groups and from 3 to 11 carbon atoms.

The invention further relates to magnetic recording media manufactured by this process.

Dispersion of the magnetic pigments in the polymeric binder or binders to which a volatile organic solvent for the polymeric binder, and minor amounts of conventional additives, such as dispersing agents, lubricants or non-magnetic fillers and pigments, such as carbon black or graphite, have been added, can be carried out in a conventional manner in conventional dispersing equipment, such as a tubular ball mill or stirred ball mill. According to the invention, an aminoalkylsilane of the formula $R_nSi(OR')_{4-n}$, wherein $n$ is 1, 2 or 3, but preferably 1, R' is alkyl of 1 to 8, preferably 1 to 3, carbon atoms and R is aminoalkyl with one or more primary or secondary amino groups and from 3 to 11, preferably from 3 to 6, carbon atoms, is added before, during or at the end of the dispersing treatment. Aminoalkylsilanes of the above formula, which contain one or more primary amino groups and a secondary amino group, and preferably those which contain at least one N-(aminoalkyl)-aminoalkyl radical as R, are very advantageous. The use of N-(aminoethyl)-γ-aminopropyl-trialkoxysilanes, especially of the corresponding trimethoxysilane, has proved to be particularly effective. The appropriate silanes can be manufactured by conventional methods.

It has proved advantageous to use from 0.5 to 8, and especially from 1.5 to 3, parts by weight of aminoalkylsilanes, based on 100 parts by weight of finely divided magnetic pigment.

The finely divided magnetic pigments which can be used are the ferromagnetic particulate materials conventionally employed in magnetic recording media. Acicular or cubic gamma-iron(III) oxide and ferromagnetic chromium dioxide are preferred, but magnetite, cobalt-modified gamma-iron(III) oxide and ferromagnetic metals and metal alloy pigments can also be used. The particle size of the finely divided metal pigments is in general from 0.2 to 2 $\mu$ and preferably from 0.3 to 1 $\mu$.

The ratio of magnetic pigment to binder in the recording media manufactured according to the invention is in general from 1 to 10, and especially from 2.5 to 5, parts by weight of magnetic pigment per part by weight of polymeric binder.

The conventional polymeric binders for magnetic recording media can also be used for the magnetic recording media according to the invention; examples are vinyl chloride copolymers, acrylate copolymers, polyvinylacetals, such as polyvinylformal or polyvinylbutyral, high molecular weight epoxy resins, polyurethanes and mixtures of these and similar binders. However, particularly advantageous binders are elastomeric linear polyester-urethanes which are soluble in a volatile organic solvent and are practically free from isocyanate groups, such as are obtained by reaction of a polyester, produced from an aliphatic dicarboxylic acid of 4 to 6 carbon atoms, such as adipic acid, and at least one aliphatic diol of 3 to 10 carbon atoms, such as 1,2- or 1,3-propylene glycol, 1,4-butanediol, diethylene glycol, neopentyl glycol or 1,8-octanediol, with a diisocyanate of 6 to 24, and especially 8 to 20, carbon atoms, such as toluylenediisocyanate or 4,4'-diisocyanatodiphenylmethane, preferably in the presence of a small amount of a glycol of 4 to 10 carbon atoms, such as 1,4-butanediol, as chain extender. Preferred polyester-urethanes are those derived from adipic acid, 1,4-butanediol and 4,4'-diisocyanatodiphenylmethane. Preferred polyester-urethanes have a Shore hardness A of from 70° to 100°, a tensile strength of from 400 to 420 kg/cm² and an elongation at break of about 440 to 560%.

For some purposes it has proved advantageous to modify the polyurethanes by mixing them, in an amount of up to 40 percent by weight and especially of from 10 to 30 percent by weight, based on the total amount of binder, with another polymeric binder proposed for the mixture, such as a vinyl chloride copolymer or vinylidene chloride copolymer which contains from 5 to 30 percent by weight, based on the total amount of monomers, of units particularly of esters of acrylic acid, methacrylic acid or maleic acid, or polyepoxy resin binders such as the commercially available binders manufactured from 2,2-bis-(4-hydroxyphenyl)-propane and epichlorohydrin.

Polymeric binders based on a copolymer containing from 70 to 95 percent by weight, and especially from 75 to 90 percent by weight, of vinyl chloride units and from 5 to 30 percent by weight, especially from 10 to 25 percent by weight, of units of an alkyl ester of an olefinically unsaturated carboxylic acid of 3 to 5 carbon atoms, such as acrylic acid, methacrylic acid or maleic acid, preferably with an alkyl radical of from 1 to 3 carbon atoms, have also proved very suitable for the process according to the invention. Products worthy of particular mention are the corresponding vinyl chloride copolymers with one or more dialkyl maleates with alkyl of from 1 to 3 carbon atoms, such as copolymers containing from 70 to 90 percent by weight of vinyl chloride units, from 5 to 15 percent by weight of dimethyl maleate units and from 5 to 15 percent by weight of diethyl maleate units. The K value (as defined by H. Fikentscher, Cellulose-Chemie, 30, 58 et seq (1932)) of particularly suitable copolymers is from 50 to 65.

Prior to, or during, dispersion other conventional additives, for example plasticizers, such as isodecyl phthalate, lubricants, such as polysiloxanes or esters of long-chain aliphatic carboxylic acids, fillers and pigments, such as carbon black or graphite, or further conventional dispersing agents, such as lecithin or stearic acids, can be added in conventional amounts to the batch. These additives are usually used in amounts of less than 10 percent by weight, based on the dry magnetic coating.

The magnetic dispersion can be applied to conventional flexible base material such as paper, cardboard and especially films of polymers, for example polyvinyl chloride films or polyethylene terephthalate films, of the usual thickness (in general from 4 to 100 $\mu$).

The magnetic coating can be produced by conventional methods. In general, the magnetic dispersion is filtered and applied to the non-magnetizable base material by means of conventional coating equipment, for example a knife coater. As a rule, orientation of the magnetic particles is effected before the fluid coating mixture has dried on the base, drying being advantageously carried out at temperatures from 50° to 90° C. The resulting magnetic coatings may be subjected to a conventional surface treatment, e.g. calendering in which the coated material is passed between polished rollers, with the optional application of pressure and optional heating at temperatures of from 50° to 100° C, preferably from 60° to 80° C. The thickness of the magnetic coating depends on the base material and the intended use of the magnetic recording medium, but is in general from 3 to 20 $\mu$ and preferably from 8 to 15 $\mu$.

The parts and percentages given in the following Examples and Comparative Experiments are by weight, unless stated otherwise. Parts by volume bear the same relation to parts by weight as the liter to the kilogram.

EXAMPLE 1

700 parts of finely divided acicular gamma-iron(III) oxide, 72 parts of carbon black, 3.5 parts of sperm oil, 1,000 parts of a solution of 720 parts of an elastomeric commercially available polyester-urethane obtained from adipic acid, 1,4-butanediol and 4,4'-diisocyanatodiphenylmethane, 180 parts of a commercial polyepoxide resin based on bisphenol A and epichlorohydrin (epoxide value 0.015) and 3,600 parts of tetrahydrofuran, and additionally 1.4 parts of polydimethylsiloxane and 17.5 parts of gamma-aminopropyltriethoxysilane are introduced into a ball mill having a capacity of 6,000 parts by volume together with 4,000 parts of 5 mm steel balls, and dispersed therein for 72 hours. The magnetic dispersion is then filtered and applied to 35 $\mu$ thick polyethylene terephthalate film to give a dry magnetic coating 11 $\mu$ thick. The coated web is then calendered between polished steel rollers heated to 80° C.

The resulting coated web is cut into ½ inch wide magnetic tapes. The magnetic tapes thus produced are tested on a commercially available IBM tape transport, the following properties being measured:

OUTPUT LEVEL

The read voltage was determined as a function of the write current. The read voltages read off from the curves obtained with specific write currents $I_S$ were referred to the IBM master tape and the deviation given in %. The results obtained with the magnetic tape are as follows:

recording density 200 fci: +4%; recording density 800 fci: +5%; recording density 1600 fci: +12%.

DURABILITY

The properties of a 100 m length of tape (recording density 3200 fci) were assessed after 1600 passes. After the test, the magnetic coating was found to have become scratched only slightly, and virtually no deposits originating from the magnetic coating or the base were to be found on the head and tape guides. The magnetic tape showed practically no increase in the number of write and read errors.

Hence, the magnetic tape manufactured according to the invention shows both an improvement in electromagnetic properties and in the wear resistance of the magnetic coating.

COMPARATIVE EXPERIMENT A

The magnetic tapes are manufactured exactly as indicated in Example 1 but 17.5 parts of soybean lecithin are added to the magnetic dispersion batch in place of 17.5 parts of gamma-aminopropyltriethoxysilane. On measuring the output level as above, the following results were obtained:

recording density 200 fci: −2%; recording density 800 fci: ± 0%; recording density 1,600 fci: + 12%.

In the durability test the magnetic coating was scratched only slightly and virtually no deposits were formed on the head and tape guides, but the tested magnetic tape showed a distinct increase in the number of write and read errors, to 40.

EXAMPLE 2

30,000 parts of acicular gamma-iron(III) oxide having an acid surface (pH = 5), 600 parts of stearic acid, 26,000 parts of a 20% strength solution of a copolymer containing 80% of vinyl chloride units, 10% of dimethyl maleate units and 10% of diethyl maleate units in a 4:6 mixture of tetrahydrofuran and toluene, and 34,000 parts of a 4:6 mixture of tetrahydrofuran and toluene are dispersed for 12 hours in a tubular ball mill having a capacity of 250,000 parts by volume, using 600,000 parts of 6 mm steel balls. 24,000 parts of the above copolymer solution and 300 parts of cetyl caprate are then added.

Dispersion is then continued for 24 hours, 1,728 parts of N-($\beta$-aminoethyl)-$\gamma$-aminopropyl-trimethoxysilane [$H_2N-CH_2CH_2-NH-CH_2CH_2CH_2-Si(OCH_3)_3$] are mixed in, the resulting coating mixture is forced through filter paper under pressure and a layer is applied to a 33 $\mu$ thick polyethylene terephthalate film, so that after drying and calendering a 15 $\mu$ thick dry magnetic coating is obtained. The coated web obtained is cut into ½ inch wide magnetic tapes and tested as follows:

MECHANICAL TESTS:

a. Head wear:

A round disc 350 μ in thickness and 7 mm in diameter consisting of mu metal is clamped in a device which provides a slow oscillating movement of about ¼ inch in length. The magnetic tape, in the form of an endless loop 20 m long, is run past the disc at a speed of 1 m/second for 60 minutes. The narrow side of the mu metal disc is abraded by the magnetic coating. The loss in weight is determined. The results are shown in Table 1.

b. Abrasion resistance of magnetic coating:

An endless loop of tape 95 cm long is run at a speed of 38 cm/second over guide rollers in such a way that the magnetic coating rubs against itself while moving in opposite directions. The tape tension is 0.75 Newton. At one point in the system the tape runs past a magnetic head which measures the change in sensitivity, expressed in dB, after 30 minutes. The results are shown in Table 1.

c. Deposits on magnetic head:

A 120 m long piece of the magnetic tape manufactured as indicated above is tested in sustained operation on a commercially available tape recorder at 30° C and 90% relative humidity. The magnetic head is examined after 120 hours to see whether deposits have formed thereon. The results are shown in Table 1.

d. Coefficients of friction:

The coefficient of friction between the magnetic coating and steel is determined before test (b) (R), after test (b) (RG) and after test (b) and cleaning of the tape with a fluorohydrocarbon (RGR), expressed as the force required to move the tape on the steel substrate under a given contact pressure divided by the load. The results are shown in Table 1.

e. Coating shed on paper:

An endless loop of tape is run as in test (b), except that the magnetic coating rubs against white filter paper for 30 minutes under a tape tension of 0.75 Newton. The brown coloration of the filter paper is assessed. The results are shown in Table 1.

COMPARATIVE EXPERIMENT B

The procedure followed is exactly as in Example 2, except that no N-(β-aminoethyl)-γ-aminopropyltrimethoxysilane is added. The resulting tapes are tested in the same way as the magnetic tapes produced according to Example 2. Table 1 shows a comparison of the test results.

TABLE 1

Test results obtained with the magnetic tapes according to Example 2 and comparative experiment B

| | | Example 2 | Comparative experiment B |
|---|---|---|---|
| (a) | Head wear (mg) | 0.18 | 0.22 |
| (b) | Abrasion resistance - change in sensitivity (dB) | −0.3 | −0.8 |
| (c) | Deposits on magnetic head | None | Slight |
| (d) | Coefficient of friction R | 0.38 | 0.29 |
| | RG | 0.27 | 0.33 |
| | RGR | 0.28 | 0.33 |
| (e) | Coating shed on paper | Slight | Severe |
| (f) | Electro-acoustic properties, relative to a standard tape | | |
| | Sensitivity (dB) | ±0 | ±0 |
| | Frequency response (dB) | +1 | −1 |
| | DC noise (dB) | 44 | 41 |
| | Modulation noise (dB) | 24 | 23 |

EXAMPLE 3

600 parts of acicular ferromagnetic chromium dioxide, 200 parts of dioxane, 200 parts of tetrahydrofuran, 15 parts of lecithin as the dispersing agent, 5 parts of isodecyl phthalate as the plasticizer and 745 parts of a 7.5% strength solution of polyvinylformal in a mixture of equal parts of dioxane and tetrahydrofuran are dispersed for 44 hours in a tubular ball mill having a capacity of 6,000 parts by volume, using 8,000 parts of 5 mm balls. 750 parts of the above polyvinylformal solution, 7 parts of isodecyl phthalate, 15 parts of dimethylpolysiloxane and 12 parts of N-(β-aminoethyl)-γ-aminopropyl trimethoxysilane are then added.

Dispersion is continued for a further hour and the resulting dispersion is then forced through filter paper under pressure. A 20 μ polyester film is then coated with the dispersion so that after drying and calendering a 6 μ thick magnetic coating is obtained. The magnetic and electrical properties of the ½ inch magnetic tapes produced from the coated web are shown in Table 2.

COMPARATIVE EXPERIMENT C

The procedure followed is exactly as in Example 3 but no N-(β-aminoethyl)-γ-aminopropyltrimethoxysilane is added. The resulting magnetic tapes are tested in the same way as those produced according to Example 3. The results obtained are also shown in Table 2.

Table 2

| | Example 3 | Comparative experiment C |
|---|---|---|
| Coercive force (oersteds) | 465 | 465 |
| Magnetic saturation (mT) | 154 | 150 |
| Residual magnetization (mT) | 116 | 102 |
| Surface resistance per square centimeter | 0.01 GΩ | 5 MΩ |

We claim:

1. A magnetic recording medium consisting essentially of a non-magnetizable flexible base and a firmly adhering magnetic coating based on a dispersion of a finely divided magnetic pigment and a silane in a polymeric binder, wherein the silane is an aminoalkylsilane of the formula $R_nSi(OR')_{4-n}$, in which $n$ is 1, 2 or 3, R' is alkyl of 1 to 8 carbon atoms and R is a radical selected from the group consisting of primary alkylamino and N-(alkylamino)-alkylamino and wherein R contains from 3 to 11 carbon atoms.

2. A magnetic recording medium as claimed in claim 1, wherein the silane contains at least one primary amino group and at least one secondary amino group.

3. A magnetic recording medium as claimed in claim 1, wherein the radical R in the aminoalkylsilane is a N-(aminoalkyl)-aminoalkyl.

4. A magnetic recording medium as claimed in claim 1, wherein the polymeric binder in the magnetic coating is based on an elastomeric polyester-urethane.

5. A magnetic recording medium as claimed in claim 1, wherein the polymeric binder in the magnetic coating is a copolymer containing from 70 to 95 percent by weight of vinyl chloride units and from 5 to 30 percent by weight of units of an alkyl ester of an olefinically unsaturated carboxylic acid of 3 to 5 carbon atoms.

6. A process for the manufacture of a magnetic recording medium by applying a layer of a dispersion of a finely divided magnetic pigment and a silane in a solution of a polymeric binder to a non-magnetizable flexible base, orienting the magnetic particles in a magnetic field and drying said layer, wherein the dispersion contains an aminoalkyl silane of the formula $R_nSi(OR')_{4-n}$, in which $n$ is 1, 2 or 3, $R'$ is alkyl of 1 to 8 carbon atoms and R is a radical selected from the group consisting of primary alkylamino and N-(alkylamino)-alkylamino and wherein R contains from 3 to 11 carbon atoms.

7. A process as claimed in claim 6, wherein the dispersion contains from 0.5 to 8 parts by weight of the aminoalkylsilane per 100 parts by weight of magnetic pigment.

8. A process as claimed in claim 6, wherein the dispersion contains a N-($\beta$-aminoethyl)-$\gamma$-aminopropyl-trialkoxysilane, in which the alkoxy radicals are each of 1 to 3 carbon atoms.

* * * * *